(12) United States Patent
Strickland (10) Patent No.: US 6,338,203 B1
(45) Date of Patent: Jan. 15, 2002

(54) TUBING RADIUS ALIGNMENT TOOL

(76) Inventor: Frederick W. Strickland, 1520 Blueberry Dr., Titusville, FL (US) 32780

( * ) Notice: Subject to any disclaimer, the term of this patent is extended or adjusted under 35 U.S.C. 154(b) by 0 days.

(21) Appl. No.: 09/531,073

(22) Filed: Mar. 18, 2000

(51) Int. Cl.$^7$ .................................. G01B 5/24
(52) U.S. Cl. ............................. 33/645; 33/533; 33/529
(58) Field of Search ........................ 33/286, 529, 533, 33/534, 574, 577, 613, 644, 645

(56) References Cited

U.S. PATENT DOCUMENTS

| | | | | |
|---|---|---|---|---|
| 3,906,638 A | * | 9/1975 | Romano | 33/534 |
| 4,191,207 A | | 3/1980 | Jacobi | 137/344 |
| 4,345,379 A | * | 8/1982 | Pettingill, Jr. | 33/666 |
| 4,420,890 A | * | 12/1983 | Naylor | 33/613 |
| 4,423,648 A | | 1/1984 | Toelke | 81/57.34 |
| 4,519,143 A | * | 5/1985 | Correlli | 33/529 |
| 4,709,485 A | | 12/1987 | Bowman | 33/228 |
| 4,742,618 A | * | 5/1988 | Watkins et al. | 33/286 |
| 4,807,370 A | * | 2/1989 | Trimble | 33/529 |
| 4,909,059 A | * | 3/1990 | King | 72/217 |
| 4,993,160 A | * | 2/1991 | Fraley | 33/286 |
| 5,148,695 A | * | 9/1992 | Ellis | 72/158 |
| 5,359,781 A | * | 11/1994 | Melville | 33/286 |
| 5,394,616 A | | 3/1995 | Claxton | 33/275 |
| 5,799,408 A | * | 9/1998 | Sprayberry | 33/645 |

* cited by examiner

Primary Examiner—G. Bradley Bennett

(57) ABSTRACT

Disclosed is a hand held radius alignment tool with an adjustable pointing device, which is pivotally mounted at one end of a single u-shaped rectangular casing for finding the rotational and desired angle from 0 to 90 degrees on the radius alignment tool. The radius alignment tool is positioned on the new piece of tubing and is allowed to slide up and down and rotate around the axis of the tubing. The technician will align the pointing device's centerline to the centerline on an existing piece of tubing while sliding the radius alignment tool up and down and rotating the tool on the new tubing. Once the tubing alignment tool and its pointing device are properly aligned with the existing tubing's centerline, the technician will use the alignment-indexing marks on the tubing's grooved radius block (which is installed in the radius alignment tool) to show where to pencil mark the new tubing. The technician will mark the starting position and the orientation position on the tubing. The pencil mark on the tubing will be used to align and rotate the tubing into the bending machine radius block's 0-degree index starting position. Once the tubing is aligned in the tube-bending machine radius block, the technician will lock the radius block lock and start the bending process to achieve the desired arc, angle and alignment to the existing tubing or tubing adapter. The technician will look at the angle of degree arrow on the back side of the alignment tool and read how many degrees from 0 to 90 to arc the new tubing.

9 Claims, 10 Drawing Sheets

TUBING RADIUS ALIGNMENT TOOL

FIELD OF INVENTION

The present invention involves a method of finding the starting position to bend a radius on a hollow piece of metal tubing, thereby ensuring the centerline of the newly arced tubing will align to an existing piece of tubing, for flaring and installing a coupling between the new and existing tubing or bulkhead adapter.

BACKGROUND OF THE INVENTION

There are many applications that involve bending metal tubing using a radius block. The tubing is manufactured in various size diameters and the tubing can be bent into specific angles using various size radius blocks. The radius blocks are installed onto a tube-bending device that rotates the radius block by using a hand crank and a combination of reduction gears to forcefully rotate the radius block and arc the tubing into the desired angle. Most of these tube-bending devices are mounted to a shop table or a tripod stand. For smaller tubing there are small hand-held tube-bending devices that are excellent. All of these tube-benders have a starting angle of 0 to 180 degrees index on the radius block. The degree index marks aid the technician in bending the tubing to a specific angle; as an example, the technician may rotate the handle of the tube-bending device, rotating the tubing radius block and bending the tubing to a 90-degree angle. The problem occurs in the alignment of the centerline of the newly arced tubing with the centerline of an existing piece of tubing that the technician is trying to bring into line. The index mark only references the angle of the bend and not the alignment of the bent tubing. The alignment of the centerline of the curved tubing and the centerline of the existing tubing are the most critical aspect of tube bending. If the bending radius starts too soon or too late, the centerline of the new and existing tubing will not align and will be offset to each other. The new tubing, or a part of it, will be wasted, especially if the tubing has more than one bend. If the technician is using a top grade of stainless steel tubing, such as aerospace workers use, the waste would be expensive.

CROSS-REFERENCE TO RELATED APPLICATIONS

Some sophisticated alignment and bending apparatus are available, such as that illustrated in U.S. Pat. No. 4,993,160 Fraley (1991), which teaches a device for aligning and preliminarily supporting conduit and pipe along a predetermined rectilinear axis, with such device including a base member, an upstanding standard attached adjacent its lower end to the brace, and a jack sleeve adjustably attached to the standard. A locking device is preferably provided to selectively attach the jack sleeve relative to the standard as desired, and an alignment bar attached to the jack sleeve extends outward therefrom to support a length of conduit or pipe to align along the rectilinear axis.

U.S. Pat. No. 4,742,618 Watkins (1988) portrays a device for visually identifying the bisector of an angle, curve, line or space between two points and for visually identifying a point or points along the bisector. The device includes a base, a first arm, a second arm, an indexing assembly, at least two connection assemblies, and a sight. Yet U.S. Pat. No. 4,345,379 Pettingill (1982), shows a tube marking tool pivotally mounted in a housing such that the end of the tube can be placed in a bore provided for this purpose in the housing. A marking tool is pivotally mounted in the housing and when moved downward, relative rotational movement between the tube and the housing provides a mark on the tube at a predetermined distance from the end of said tube.

In U.S. Pat. No. 3,906,638 Romano (1975) describes an angle trisecting device for trisecting an angle comprised of a substantial plate-like guide member having two sides meeting at right angles to form a corner.

Another example is shown in U.S. Pat. No. 5,359,781 Melville (1994), which features a self-centering pipe axis laser guide based on the use of three parallel links spaced 120 degrees apart, which are engaged to be expanded or contracted. When expanded the links contract the inside diameter of the pipe, which accordingly establishes the center axis of the pipe. The driving means for the links is a rotating screw mounted in a base centrally located with respect to the three links. In the front of the base is a laser module whose beam is aligned with the center axis of the pipe.

Yet another example of bending tubing is U.S. Pat. No. 4,909,059 King (1990), involving a metal tube-bender which forms arcs into metal tubing by engaging a swing-arm mounted roller against a clamped tubing section and rotating the roller through an arc necessary to place the desired degree of bend into the tubing. The tubing is clamped against a forming plate that is provided with a peripheral groove of uniform radius and serves as a die for the forming operation.

Yet another type of prior art for bending tubing is U.S. Pat. No. 5,148,695 Ellis (1992), showing a bending apparatus for metal pipe and tubing which includes an upright spindle assembly. This assembly is comprised of a lower section mounted on the spindle assembly for rotational movement around the spindle—the lower section can be selectively moved around and engaged with the spindle assembly; an upper section which is rotatably mounted on the spindle assembly and removably connected to the lower section—the upper section includes a removable shoe bender; and a radius die positioned at the top of the spindle assembly and in pipe or tube engaging alignment with the shoe bender.

All of the above-mentioned bending apparatuses do not have a method to indicate where to correctly start the bending radius and ultimately have the centerline of the newly arced tubing aligning with an existing piece of tubing.

A further disadvantage of these alignment devices is that they do not show where to correctly start the bending radius of the tubing or the orientation, so that the newly arced tubing and the existing tubing will be in line with the proper angle and orientation or direction.

An additional disadvantage is the technician must stop the tubing fabrication to mathematically calculate where to mark the tubing to start the next radius bend.

Yet another disadvantage is that some technicians will start the 90-degree bend a little further away from the end of the tubing so that they can make an end cut and compensate for the offset at the 90-degree end where the new and existing tubing were misaligned. This method will not work when there is more than one arc in the tubing.

BRIEF SUMMARY OF THE INVENTION

It is, therefore, a primary objective of the present invention to provide a tubing radius alignment tool that gives a technician the exact starting point to start the tube arcing process and ultimately align the centerline of two separate pieces of tubing.

A further objective of the invention is to provide a tubing radius alignment device that is easy to use with one hand.

Another objective of the invention is to provide a tubing radius alignment tool that references the starting and orientation marks. The technician will mark the new tubing using these starting and orientation points.

Yet another objective of the invention is to provide an alignment device that will support a plastic pointing device or a prior art handheld small laser pin light.

Still another objective of the invention is to provide an alignment device with a grooved uniform radius to guide along the surface of the new tubing.

One more objective of the invention is to provide a pin laser light and or pointer holder which can be rotated from a 0-to a 90-degree angle from the tubing alignment base's centerline.

It is desirable to obtain the foregoing in a device that is easy to manufacture and cost effective to the consumer.

Additional objectives and advantages of the present invention are set forth in part by the description that follows, and in part it will be obvious from the implementation and direct use of this invention. The objectives and advantages may be realized and attained by means of the instrumental and combinations particularly specified in the appended claims.

To achieve the following, and other objectives and advantages, and in accordance with the purposes of the present invention as embodied and broadly described herein: The present invention is intended to provide a tubing radius alignment tool that gives a technician the exact starting point and orientation to start the tube bending process to align two separate tubing centerlines.

In actual operation the technician will place the tubing alignment tool on the back side surface of the new tubing and slide the device along the tubing axis until the pin laser light or pointer is pointed directly into the centerline of the existing tubing. The rotation of the tubing radius alignment tool around the axis of the new tubing will align the pointer to the centerline of the existing tubing and orient the direction the tubing will be arced. Once the centerline is defined the technician will draw a mark on the new tubing at the radius index and orientation points that are marked on the surface of the tubing alignment tool's grooved radius block and then remove the alignment device. The technician will put the tubing in a radius block and slide the mark on the tubing to the 0-degree index mark and rotate the orientation mark to the radius arc of the die and then close the lock. Rotating the bending tool's handle will rotate the tubing radius block and arc the tubing to the desired angle. The desired degree of angle is found on the back side of the tubing radius alignment tool. These numbers indicate to the technician to what degree the new tubing should be rotated, by using the degree index mark on the radius bending block.

With these and other objectives in view, the invention will be best understood from the consideration of the following detailed description, taken in connection with the accompanying drawing forming a part of this specification; with the understanding, however, that the invention is not confined to any strict conformity with the showing of the drawing but may be changed or modified so long as such changes or modifications make no material departure from the silent features of the invention as expressed in the appended claims.

DRAWING REFERENCE NUMERALS

10 Tubing Alignment Tool
12 Pointing Device
14 Pointing Device Holder
16 Pointing Device Base
18 45-Degree Index Mark
24 90-Degree Index Mark
24'90-Degree Drawn Line
26 Radius Block Support Base
28 Right Radius Block Locking Guide
30 Right Radius Block Locking Rail
32 Left Radius Block Locking Guide
34 Left Radius Block Locking Rail
36 Radius Block Locking Recess
38 Flanged Trigger Protector
40 Trigger Lock
42 Trigger Pivot Pin
44 Radius Block Trigger
46 Radius Block Trigger Spring
19 Orientation Index Mark
19' Orientation Drawn Line
20 Larger Grooved Radius Block
21 Recessed Area
22 Small Grooved Radius Block
50 Pointing Device Pivot Washer
52 Pointing Device Pivot Screw
48 Pointing Device Pivot Hole
54 Pointing Device Pivot Screw Threads
56 Radius Block Support Base Pivot Stud
58 New Tubing To Be Arced
59 Exiting Tubing Or Tubing Fixing
60 Manual Radius Bending Block Machine
62 0-Degree Angle Index Mark
64 Manual Radius Binding Block
65 Radius Centerline 66 Degree Index
67 Angle Of Degree Arrow
68 Rotating Handle

DETAILED DESCRIPTION OF THE INVENTION

Figure 1:
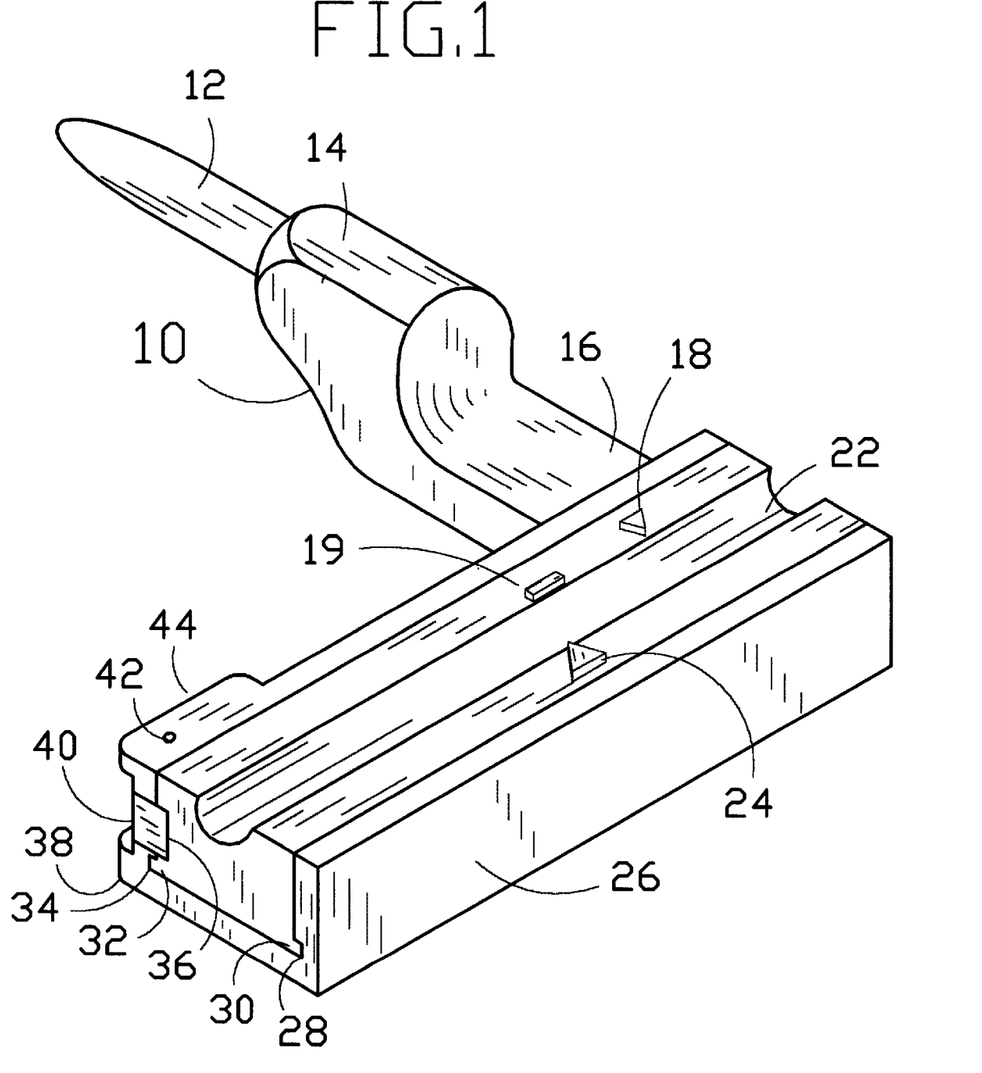
FIG. 1 is a perspective view of the tubing alignment tool, showing the pointing device at a 90-degree angle.
Figure 3:
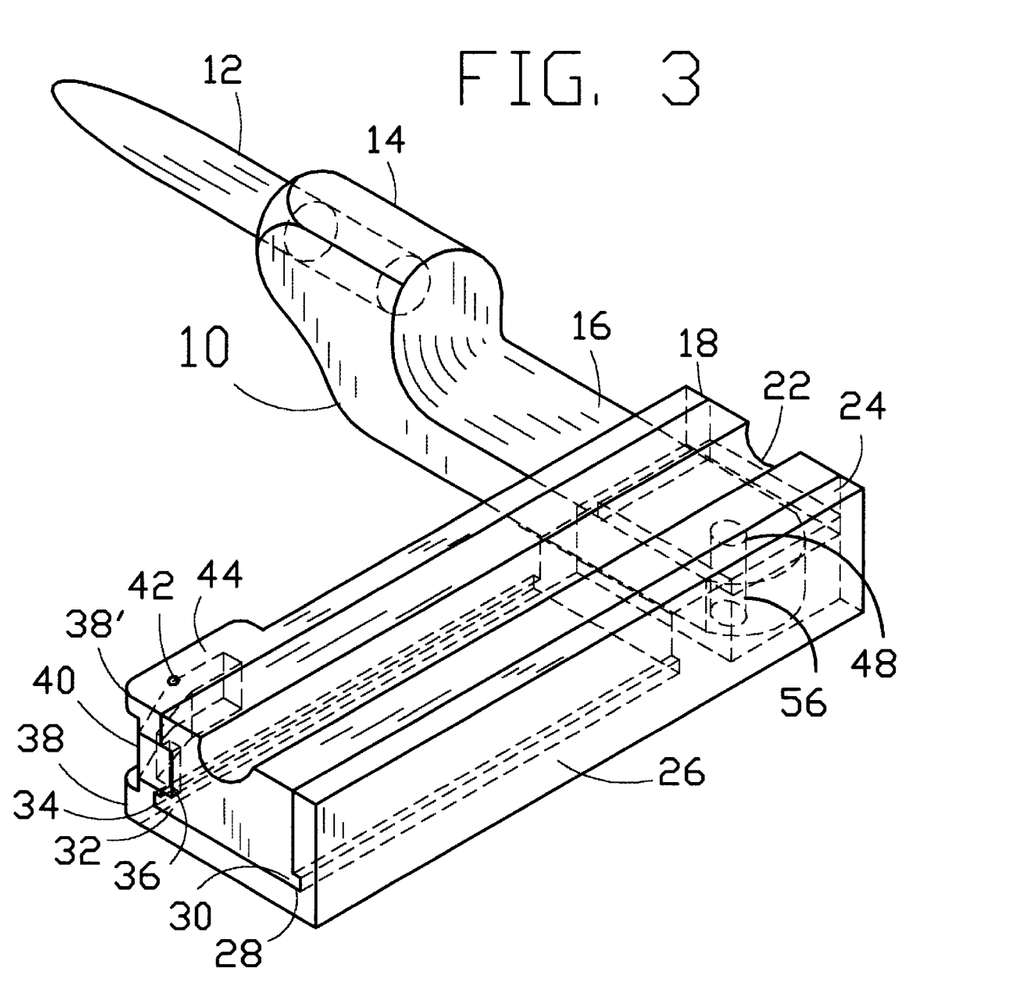
FIG. 3 is a perspective view of the tubing alignment tool showing the hidden sections like the pointer, pointer's swivel brace, tubing radius block, release button and spring.
Figures 4, 5, 6:
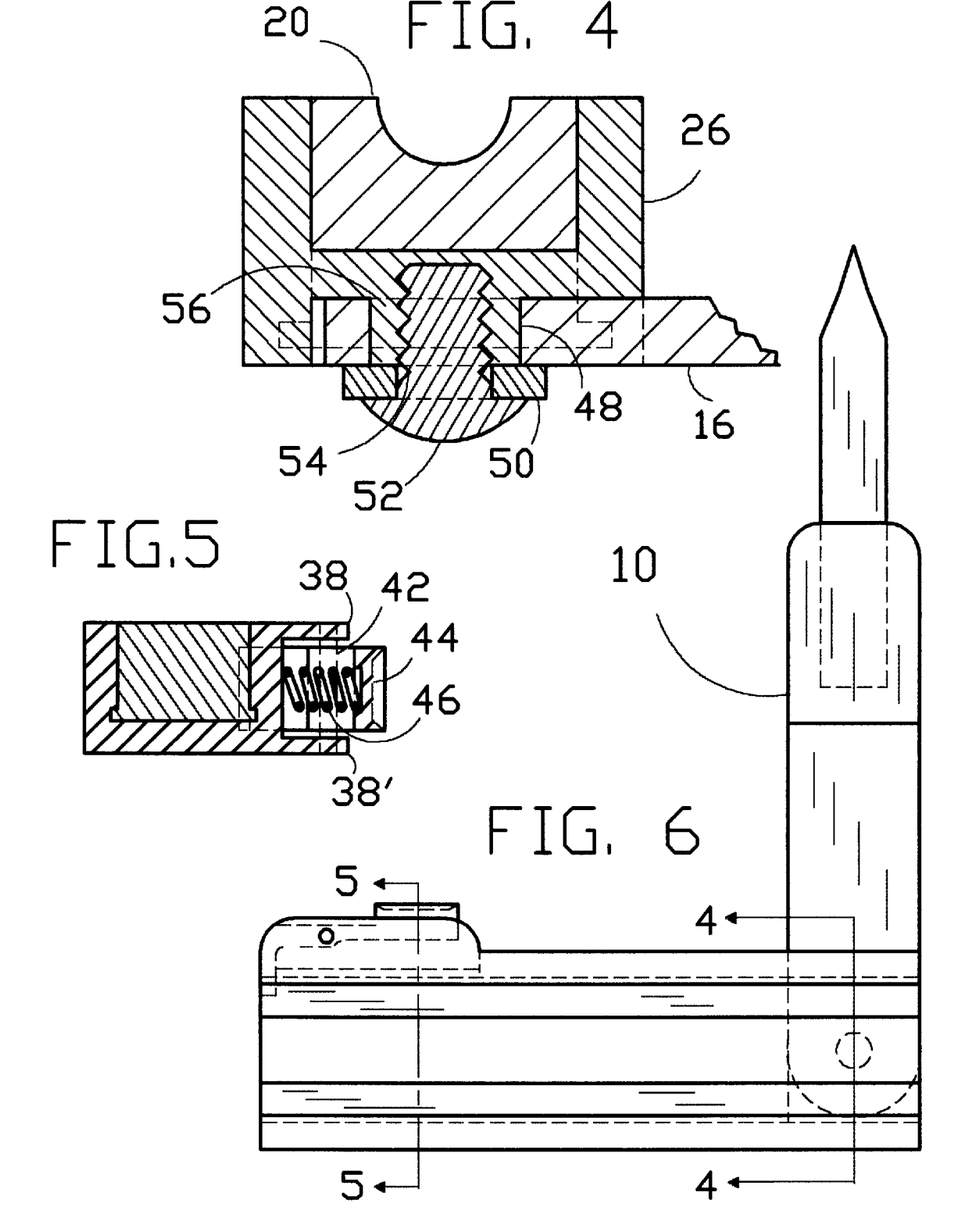
FIG. 4 is a sectional view showing the pointer's swivel base and fastening means.
FIG. 5 is a sectional view showing the release trigger, spring, tubing groove radius block and tubing alignment tool base.
FIG. 6 is a sectional view showing the sectional planes.

Referring with greater particularity to the drawing, the reference numeral 10 indicates generally a tubing alignment tool, embodying the principles of the invention. FIG. 1 and FIG. 3 show a perspective view of a tubing radius alignment tool 10 having a pointing device 12 installed into a pointing device holder 14. The pointing device holder 14 has a pointing device base 16 and on one end is a pointing device base pivot hole 48. The pivot hole 48 and the pointing device base 16 are installed onto a radius block support base's 26 pivot stud 56. The pointing device base 16 is secured to the pivot stud 56 with a pivot washer 50 and a pivot screw 52, as best shown in FIG. 4. The radius block support base 26 supports a small grooved radius block 22 having a right grooved radius block locking rail 30 and a left grooved radius block-locking rail 34. Each grooved radius block locking rail 30 and 34 is supported in the radius block support base 26 by a right radius block support furrow 28 and a left radius block support furrow 32. On the end of the radius block 22 is a radius block locking recess 36 to receive a radius block trigger lock 40. The radius block trigger 44 is connected to the radius block support base 26 by a pivot pin 42 and the pivot pin 42 is installed into a set of trigger protectors 38 and 38'. There are three index marks: the first is a 45-degree index mark 18; the second, a 90-degree index mark 24; and third is an orientation index mark 19. All are located on the top surface of the grooved radius blocks 22 and 20.

Figures 2, 2A:
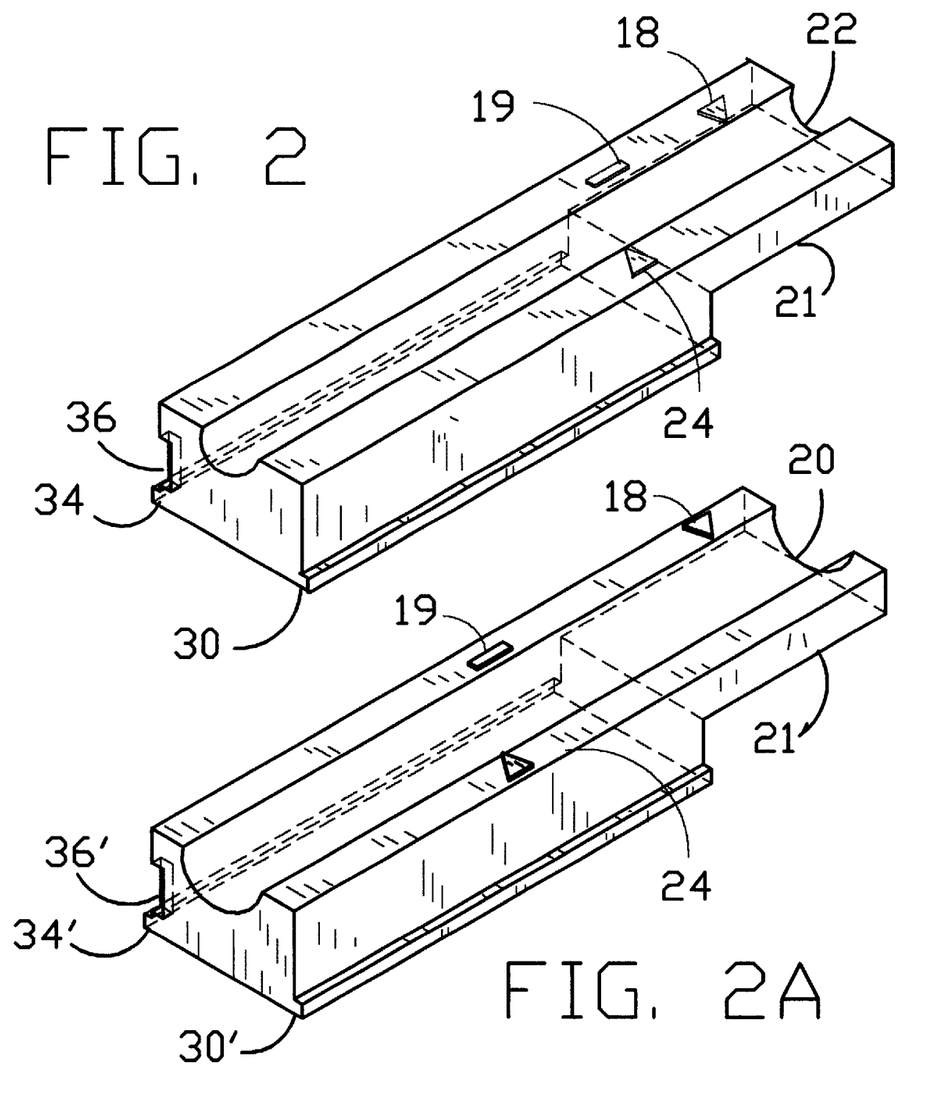
FIG. 2 is a perspective view of the tubing alignment tool showing examples of the different tubing sizes grooved radius blocks.

FIG. 2 best shows the small grooved radius block 22 having a right grooved radius block locking rail 30, and a left grooved radius block locking rail 34. Also shown is a large grooved radius block 20 having a right grooved radius block locking rail 30' and a left grooved radius block locking rail 32'. At one end of each grooved radius block 20, 22 is the grooved radius block locking recess 36 and 36', and at the far end of each is a recessed area 21.

A sectional view in FIG. 4 illustrates the pointing device base 16 and shows that on one end of the pointing device base 16 is a pivot hole 48, the pivot hole 48 is installed onto the radius block support base's 26 pivot stud 56. The pointing device base 16 is secured to the pivot stud 56 with the pivot washer 50 and a set of pivot screw threads 54 securing the pivot screw 52.

Depicted in FIG. 5 are the two radius block trigger protectors 38 and 38', supporting the radius block trigger 44 by a radius pivot pin 42. The radius block trigger 44 is urged to close by a trigger spring 46 locking the grooved radius block 20 or 22 into the radius block support base 26.

FIG. 6 shows the cutting plain for FIG. 4 and FIG. 5.

Figure 7:
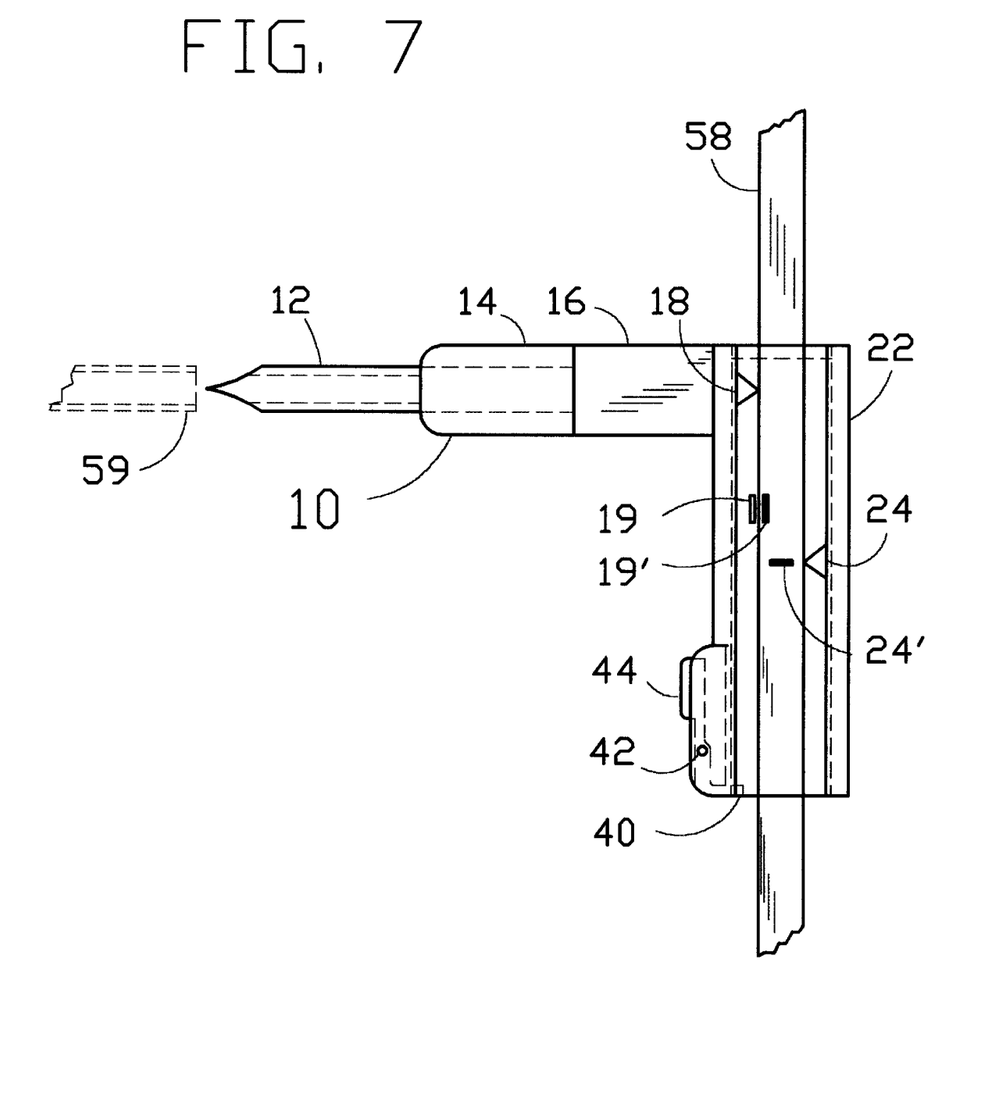
FIG. 7 is a perspective view showing how the tubing alignment tool slides on the tubing to rotate and align the pointer with an existing piece of tubing or to align the new tubing to a bulkhead fixture or other area the technician would like to align with the centerline of the tubing.

FIG. 7 shows the prior art section of a piece of installed tubing 59; also shown is a piece of tubing 58 that will be marked at some degree, from 0 degree to 90 degrees, to start its arcing procedure. For example, at a 45-degree radius bend a person would use index mark 18 and for a 90-degree radius a person would use index mark 24.

Figure 8:
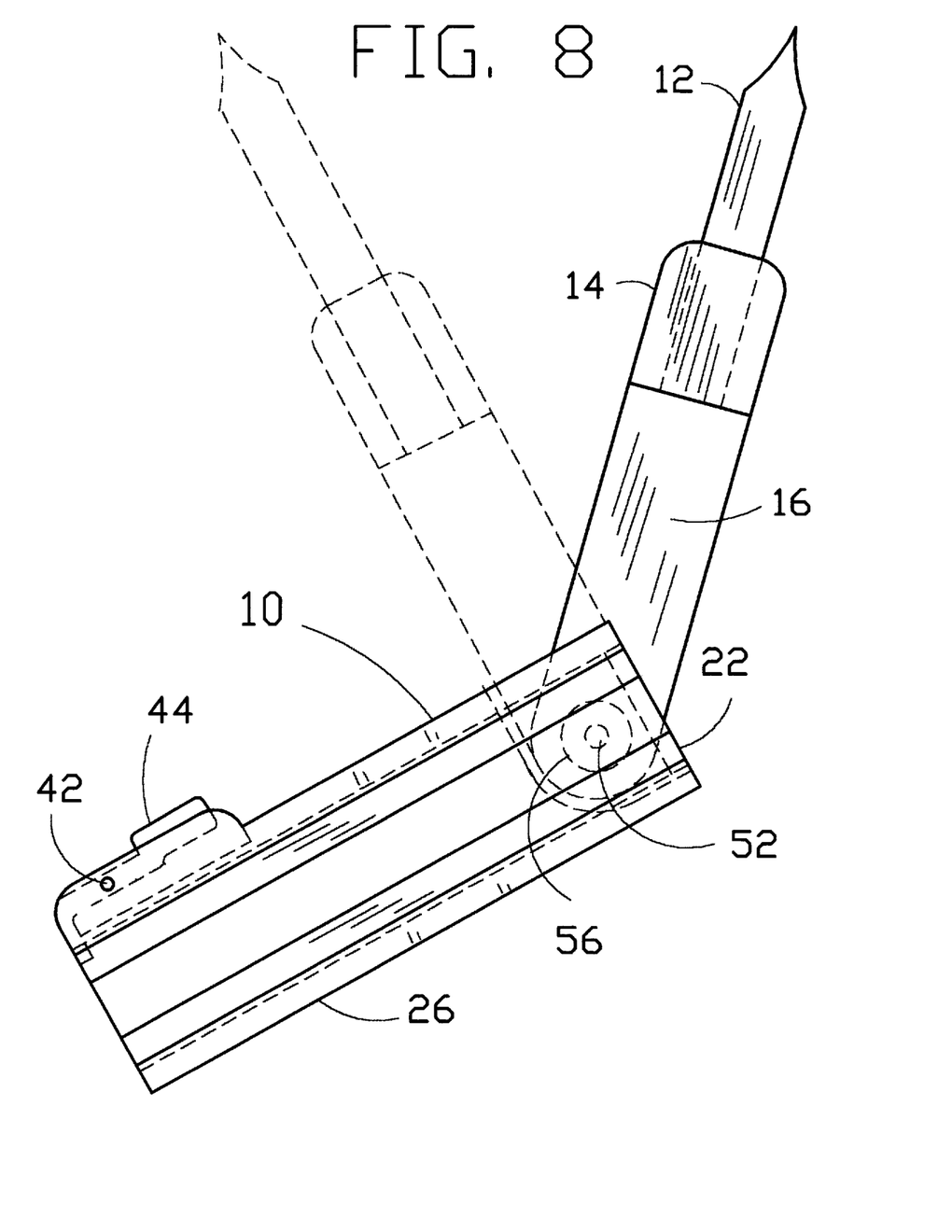
FIG. 8 is a perspective view showing the pointer from the 90-degree index position to a 45-degree indexed position.

FIG. 8 demonstrates the movement of the pointer 12, pointer holder 14, and the base 16 from a 90-degree angle to a 45 degree angle from the radius block support base 26.

Figure 9:
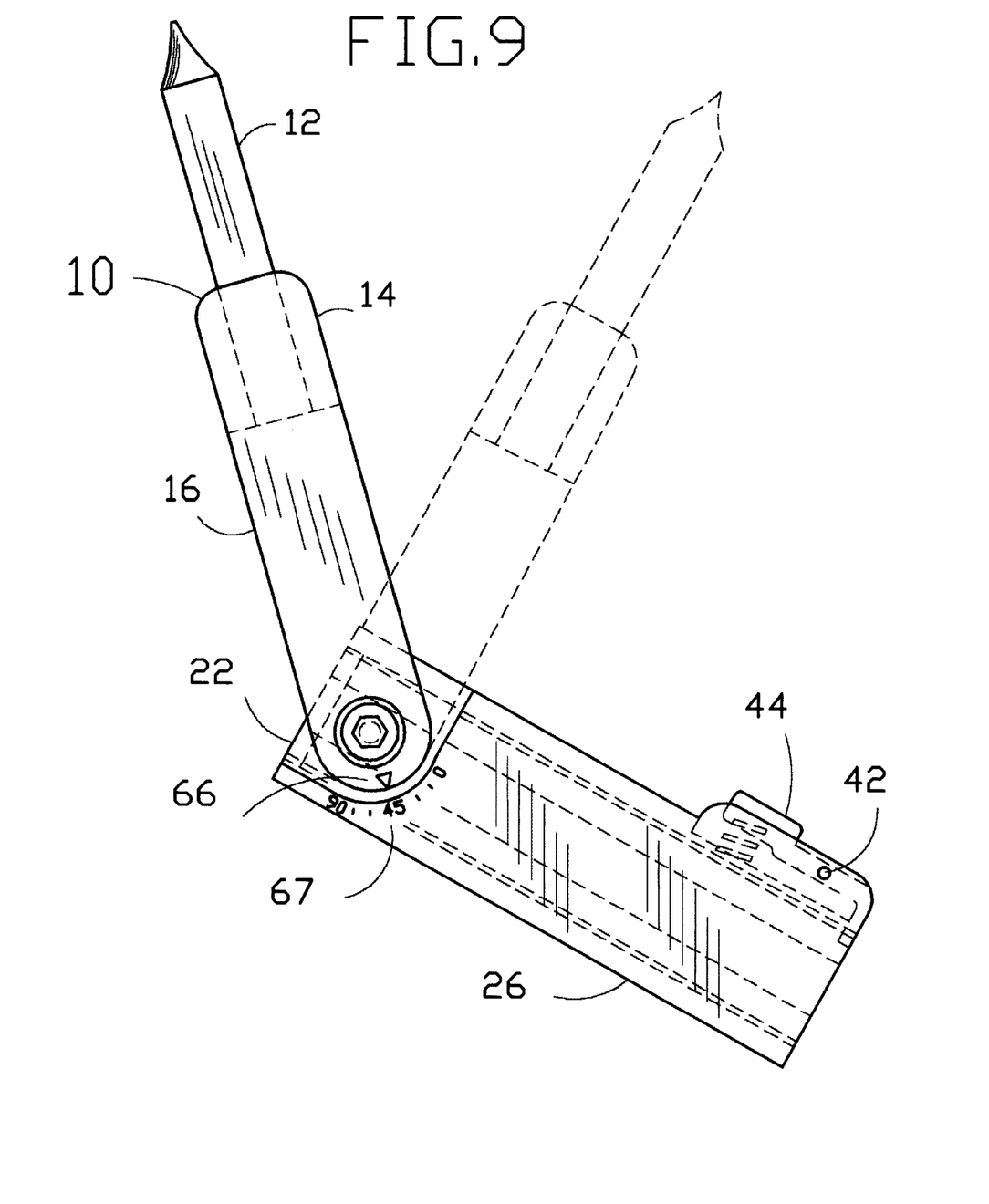
FIG. 9 is a perspective view showing the back side of the tubing alignment tool showing the angle indexing marks.

FIG. 9 best illustrates an angle degree index mark 66 located on the back side of the tubing radius tool 10; on the opposite end of the pointing device holder 14 is an arrow 67 marked on the center axis of the pointer device base 16.

Figure 10:
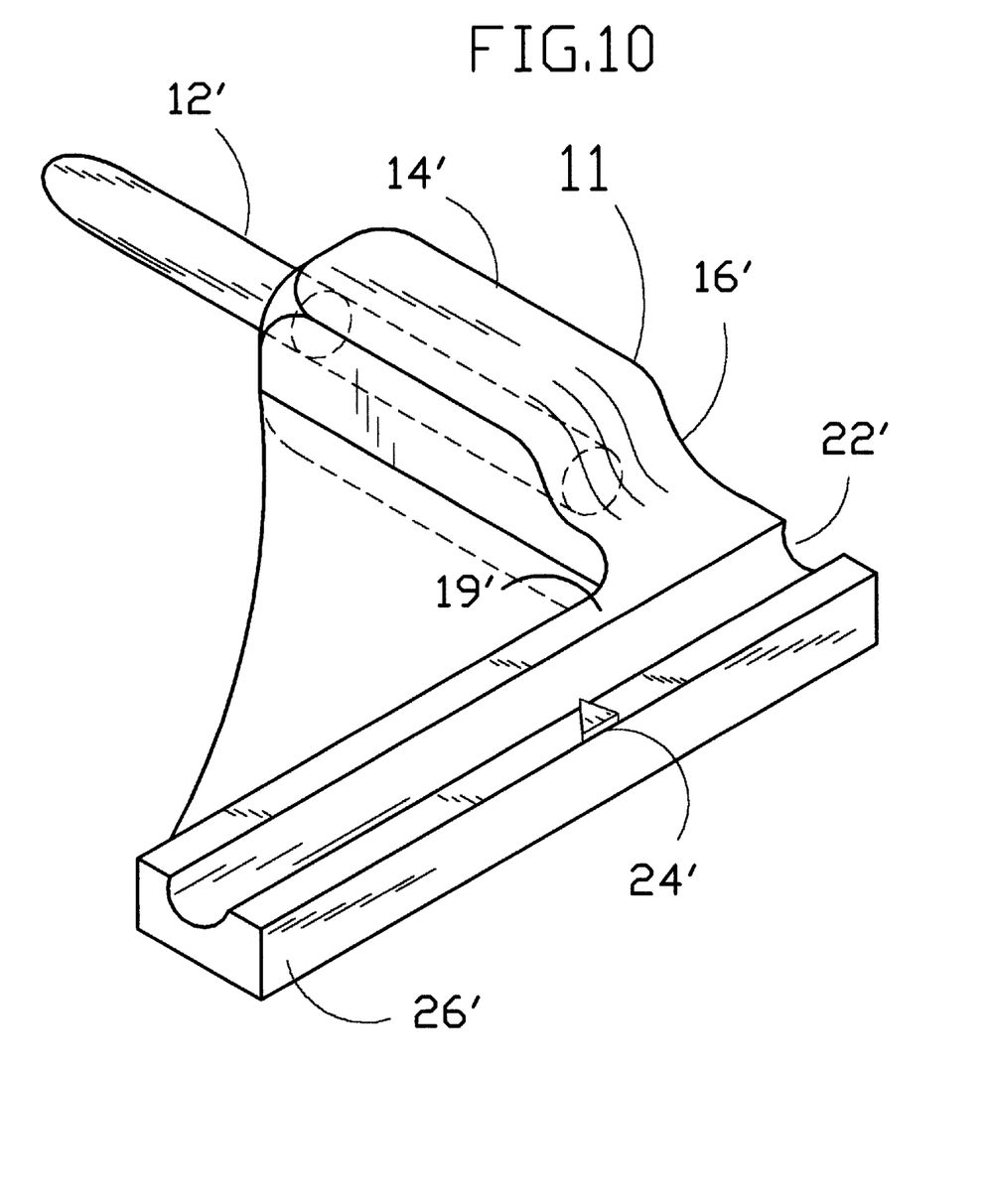
FIG. 10 is a perspective view showing the tubing alignment tool as a one piece molded tool.

A second embodiment of this tool is shown in FIG. 10. Reference numeral 11 indicates generally a tubing alignment tool, embodying the principles of the invention and shows a perspective view of a tubing radius alignment tool 11 having a pointing device 12' installed into a pointing device holder 14'. The radius block support base 26', the grooved radius block 22', and the pointer base 16' are molded as one piece. An alignment mark 24' appears on the top surface along with the orientation mark 19'.

Figure 11:
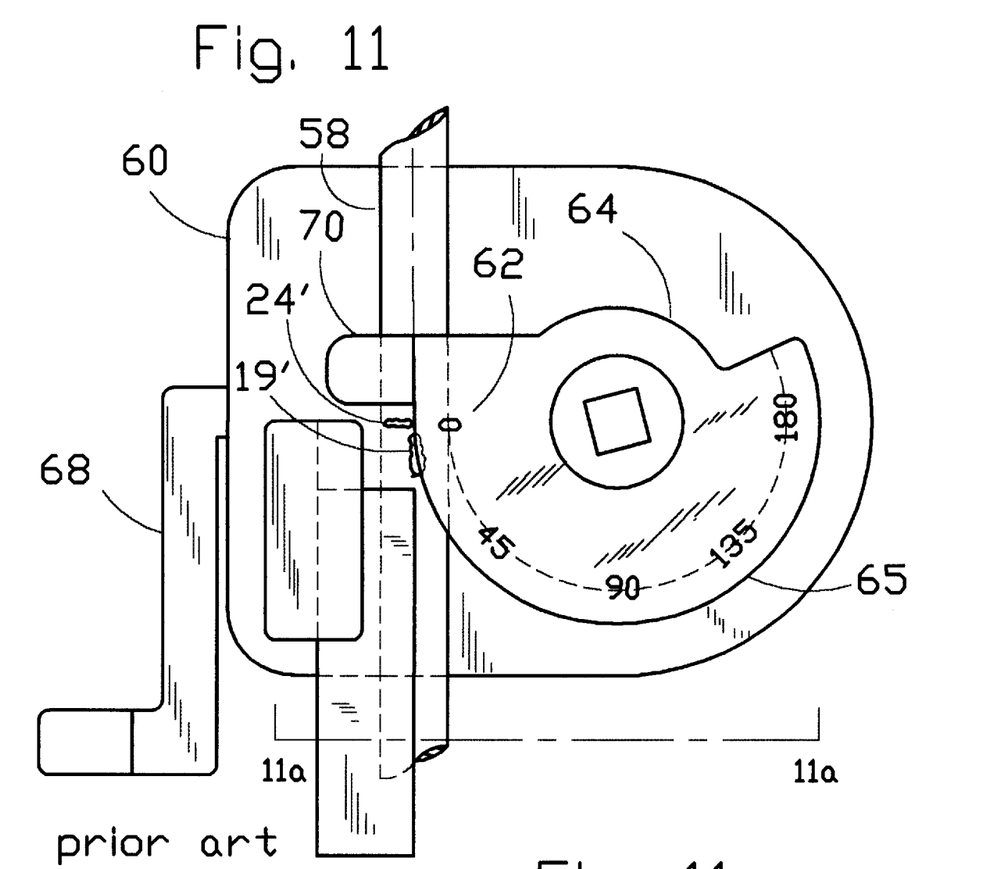
FIG. 11 is a perspective view that shows a prior art tubing bender.

FIG. 11 best shows the prior art tube bender 60 showing how the tubing's 58 index mark is aligned to the zero mark 62 on the manual radius-bending block 64. The tubing 58 rotational mark 19' is aligned to the centerline surface 65 of the manual radius-bending block 64. The tubing lock 70 locks the tubing 58 into the radius bending 64.

Figure 11A:
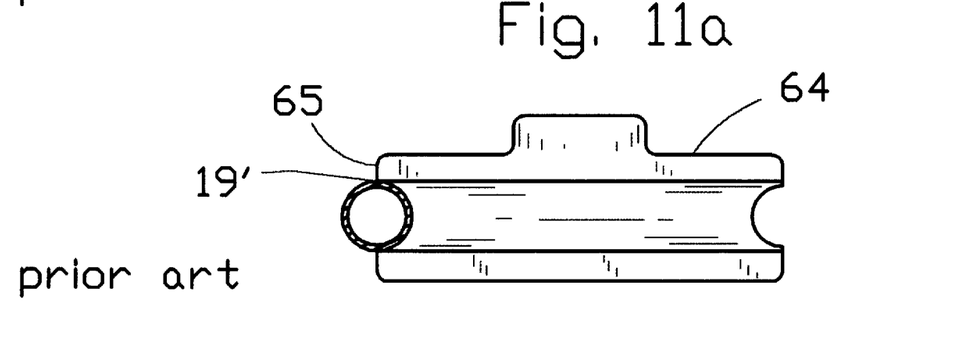
FIG. 11a is a sectional view that shows the prior art's radius centerline.

FIG. 11a best shows the tubing's rotation mark 19' aligned to the centerline surface 65 of the manual radius-bending block 64.

Figure 12:
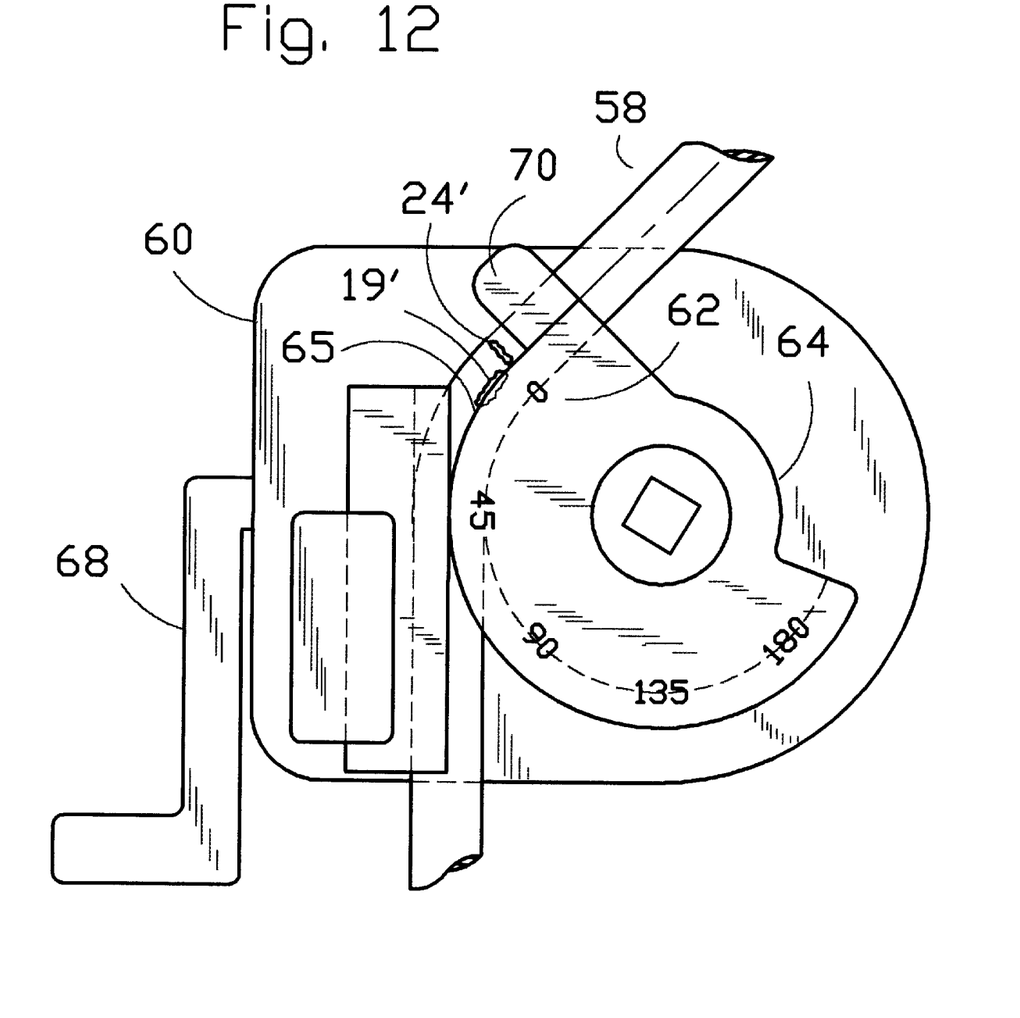
FIG. 12 is a perspective view shows a prior art tubing bender rotating the tubing to a desired degree.

FIG. 12 best shows how the tubing 58 index mark 24 is aligned to the zero mark 62 on the manual radius-bending block 64. The tubing's 58 rotational mark 19' is aligned to the center line surface 65 of the manual radius-bending block 64 and by rotating the handle 68, rotates the manual radius-bending block 64 to a 45 degree angle, as shown.

In operation a person will determine the diameter of tubing to be used and select the correct size grooved radius block; for example, radius block 22. On each lower side of radius block 22 are slide rails, right slide rail 30 and left slide rail 34. These slide rails 30 and 34 will line up to the right radius block support furrow 28 and the left radius block support furrow 32. Pressing down on the trigger 44 compresses the trigger spring 46 and allows the radius block 22 to slide past the trigger lock 40 and slide along the radius block support base 26 furrows 28 and 32. As the radius block 22 slides all the way into the radius block support base 26, the technician will release the trigger 44, allowing the trigger to rotate on the pivot pin 42. Pivot pin 42 is supported by two trigger protectors 38 and 38', and the force exerted by the trigger spring 46 will rotate the trigger 44 closed, locking the trigger lock 40 into the radius block locking recess 36. This will lock the radius block 22 into the radius block support base 26.

A prior art, laser light pointer or plastic pointer 12 will slide into the pointing device holder 14. After the pointing device 12 is installed into the pointing device holder 14 the technician will use a screwdriver to loosen the pivot screw 52, relaxing the tension on the pivot washer 50 and allowing the pointing device base 16 and pointing device base hole 48 to rotate on the radius block support base's pivot stud 56. If, for example, the technician knows he needs a 90-degree angle, he will rotate the pointing device base 16 to the 90-degree angle position and using a screwdriver will tighten the pivot screw 52. This action will compress the pivot washer 50 and the pointing device base 16, locking the pointing device base 16 in the 90-degrees position.

At this point the technician will position the tubing radius alignment tool 10 on the back side of the tubing 58. By moving the tubing radius alignment tool 10 and radius block 22 next to the tubing 58 and seating the grooved radius block 22 firmly onto the side of the tubing 58, the tubing radius alignment tool 10 will be allowed to slide up and down on the tubing 58. Holding the tubing radius alignment tool 10 in close proximity to the tubing and sliding the tubing radius alignment tool 10 up and down and/or along the surface to the tubing 58 will move the pointing device 12 into alignment with the centerline of the existing tubing 59. Once the tubing's 59 centerline is defined with the pointing device 12 the technician will draw a line on the side of tubing 58, perpendicular to the axis of the tubing from the index mark 24. The index mark will be the 90-degree index mark 24 on the surface of the grooved radius block 22. The same would be true if the technician was using the 45-degree index mark 18 for a 45-degree bend. Once the centerline is defined and the technician has marked the new tubing at the 90-degree-index mark 24, he will remove the tubing radius alignment tool from the tubing. The technician will then put the tubing into the (prior art) manual radius bending machine 60 and slide the mark on the tubing to the 0-degree index mark 62 on the radius bending block 64 and close the radius bending block's lock 65. Rotating the bending tool's handle 68 will rotate the tubing radius bending block 64 and bend the tubing 58 to the desired angle and alignment.

If the technician has made more than two bends in a single piece of tubing and the next bend will be at an odd angle from the other two previous bends, the technician will hold the tubing radius alignment tool 10 in close proximity to the tubing and slide the tubing radius alignment tool 10 up and down and/or along the surface of the tubing 58, moving the pointing device 12 into alignment with the centerline of the existing tubing 59. Once the tubing's 59 centerline is defined with the pointing device 12 the technician will draw a line 24' on the side of tubing 58 perpendicular to the axis of the tubing from the index mark 24. As the pointing device 12 is aligned to the tubing 59 the rotation and the alignment of tubing 58 will be in the correct direction. The technician will draw a second line 19' parallel to the tubing axis 58 at the orientation index mark 19. The technician has two marks; one is the radius alignment index mark 24' and the other is the rotational index mark 19'. With the radius alignment index mark 24' marked on the tubing 58 the technician will align the mark 24' to the 0-degree mark 62 on the manual radius bending block 64. Before locking the tubing in the manual radius bending block 64, the technician will rotate the tubing 58 until the rotational mark 19' is aligned to the centerline surface 65 of the manual radius bending block 64. At this time the technician will lock the tubing in place and start the arcing process by rotating handle 68 of the manual tube-bending machine 60. The technician will look at the angle of degree arrow 67 on the back side of the alignment tool 10 to read how many degrees 66 to arc the new tubing 58.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A tubing radius alignment tool with a movable pointing element and an interchangeable grooved radius element to establish the radius and angle starting points for tube bending comprising:
   a) a single, generally u-shaped rectangular casing,
   b) a single generally rectangular box-like element that telescopically slides into said casing and
   c) a generally rectangular shaped pivotal element that is mounted to said u-shaped rectangular casing.

2. The tubing radius alignment tool according to claim 1, further including at least one recess in the inside walls of said u-shaped rectangular casing.

3. The tubing radius alignment tool according to claim 2, further including on one end a recessed area and a stud centrally located in said recess of said u-shaped rectangular casing.

4. The tubing radius alignment tool according to claim 2, further including a locking means on one end of said u-shaped rectangular casing to prevent the said generally rectangular box-like element from sliding out of the said casing.

5. The tubing radius alignment tool according to claim 2, further including at least one indexing mark on the bottom surface of said u-shaped rectangular casing.

6. The tubing radius alignment tool according to claim 1, further including a rail running the full length on at least one side and along the axis of said box-like element.

7. The tubing radius alignment tool according to claim 6, further including a grooved centrally located on the top surface and extends from one end to the opposite end of the said box-like element and at least one indexing mark on the topside of the said box-like element.

8. The tubing radius alignment tool according to claim 1, further including a cavity on one end of said generally rectangular shaped pivotal element whereby to support a pointing device.

9. The tubing radius alignment tool according to claim 1, further including a through hole on the opposite end of said pointing device cavity and a fastening means for said generally rectangular shaped pivotal element to be mounted to said u-shaped rectangular casing.

* * * * *